United States Patent [19]
Sano

[11] Patent Number: 5,479,064
[45] Date of Patent: Dec. 26, 1995

[54] PIEZOELECTRIC ACTUATOR WITH A DISPLACEMENT ENLARGING FEATURE

[75] Inventor: Mitsunori Sano, Tokyo, Japan

[73] Assignee: NEC Corporation, Tokyo, Japan

[21] Appl. No.: 365,225

[22] Filed: Dec. 28, 1994

[30] Foreign Application Priority Data

Feb. 28, 1993 [JP] Japan .................. 5-334811

[51] Int. Cl.⁶ ........................................ H01L 41/053
[52] U.S. Cl. ........................... 310/328; 400/124.16
[58] Field of Search .................. 310/328; 400/124.16

[56] References Cited

U.S. PATENT DOCUMENTS

| | | | |
|---|---|---|---|
| 4,547,086 | 10/1985 | Matsumoto et al. | 400/124.16 |
| 4,570,095 | 2/1986 | Uchikawa | 310/328 |
| 4,703,215 | 10/1987 | Asano | 310/328 |
| 4,736,131 | 4/1988 | Fujimoto | 310/328 |
| 4,783,610 | 11/1988 | Asano | 310/328 |
| 4,874,980 | 10/1989 | Mine et al. | 310/328 |

FOREIGN PATENT DOCUMENTS 3-89873  4/1991  Japan .
3-198388 8/1991  Japan .
3-218274 9/1991  Japan .

*Primary Examiner*—Thomas M. Dougherty
*Attorney, Agent, or Firm*—Young & Thompson

[57] ABSTRACT

A piezoelectric actuator has a housing having a top portion with an opening. A Y-shaped member comprising a bottom arm and divided two top arms. The bottom arm is fixed on a bottom portion of the housing and the divided two top arms are placed in a movable state. A detachable member is so fitted into the opening of the housing as to be detachable from the opening of the housing. A piezoelectric device has one end being fixed to the detachable member and the opposite end being in contact with a valley portion of the Y-shaped member so that when the piezoelectric device extends in a longitudinal direction by a voltage application then the opposite end presses down the alley portion thereby a distance between the tops of the divided two top arms of the Y-shaped member is enlarged. A beam has opposite ends being fixed to topes of the divided top arms and a center portion displaceable in a vertical direction when a distance between the tops of the divided top arms of the Y-shaped member is changed.

4 Claims, 4 Drawing Sheets

5,479,064

PIEZOELECTRIC ACTUATOR WITH A DISPLACEMENT ENLARGING FEATURE

BACKGROUND OF THE INVENTION

The invention relates to a piezoelectric actuator, and more particularly to a piezoelectric actuator with a displacement enlarging feature.

In the prior art, various type piezoelectric actuators have known, one of which will be described with reference to FIG. 1. The conventional piezoelectric actuator has a mounting substrate 21, lever arms 23 being mechanically connected through hinges 22 on opposite sides in one direction of the mounting substrate 21, a piezoelectric device 24 being provided in a rear side of the mounting substrate 21 and being mechanically connected to rear ends of the lever arms 23 and a beam 25 being provided in a front side of the mounting substrate 21 and being mechanically connected to front ends of the lever arms 23. The beam 25 has a larger length than a distance between front ends of the lever arms 23 so that the beam 25 always has a small curvature wherein a center portion of the beam 25 lies at a higher level than that of the opposite end portions of the beams 25.

When the piezoelectric device 24 is applied with a voltage, then the lever arms 23 move around the hinges 22 as supporting points so as to reduce the distance between the front ends of the lever arms 23 thereby the curvature of the beam 25 becomes large. As a result, an amount of the displacement of the center portion of the beam 25 becomes large.

The above piezoelectric actuator has a disadvantage as follows. If ,the piezoelectric device in the actuator comes into failure, an exchange of the piezoelectric device is required. However, the piezoelectric device is securely fixed to the lever arms by a thermosstring adhesive. For that reason, if any failure appears in the piezoelectric device, then it is required to exchange the actuator and all. Further, if it is required to change a performance of the piezoelectric device only, then the actuator and all are exchanged.

The above structure of the piezoelectric actuator also has a disadvantage as follows. The piezoelectric device has a poor resistivity to the tensile load, but a sufficient resistivity to the compression load. For that reason, it is preferable to always apply a preload or a small compression load to the piezoelectric device. Notwithstanding, the above structure of the conventional piezoelectric actuator has no feature to apply any compression load to the piezoelectric device.

Another type of the conventional piezoelectric actuator is disclosed in the Japanese patent application No. 3-89873, a structure of which is illustrated in FIG. 2. The piezoelectric actuator has a piezoelectric device 31, a movable member 32 securely fixed to the piezoelectric device 31 to transmit a displacement of the piezoelectric device 31 into an exterior, an elastic member 33 for pressing up the movable member 32 to apply a preload or a compression load to the piezoelectric device 31 and a case 39 for accommodating the piezoelectric device 31, the movable member 32 and the elastic member 33 and further a guide 35 fixed to the case 39 for providing a guide for motion of the movable member 32.

The above piezoelectric actuator has a disadvantage as follows. If the piezoelectric device in the actuator comes into failure, an exchange of the piezoelectric device is required. However, the piezoelectric device is securely fixed to the case 39 of the actuator. If any failure appears in the piezoelectric device, then it is required to exchange the actuator and all. Further, if it is required to change a performance of the piezoelectric device only, then the actuator and all are exchanged.

Further, the above actuator has no displacement enlarging feature. For that reason, if a large displacement of the movable member, then it is required to design the piezoelectric device to have a large length in an expanding direction thereof.

Still another type of the conventional piezoelectric actuator is disclosed in the Japanese Patent Application No. 3-218274, whose structure is illustrated in FIG. 3. The piezoelectric actuator has a substrate 41, a cylindrically shaped piezoelectric device 42 being provided over the substrate 41 through an insulator so that the piezoelectric device 42 is isolated from the substrate 41. A movable member 43 is securely fixed on the piezoelectric device 42 to transmit a displacement of the piezoelectric device 42 to an exterior. A spring member 44 is provided between top portion of the frames united with the substrate and %he movable member 43 so that the spring member 44 presses down the movable member 43 to apply a reload or a compression load to the cylindrically shaped piezoelectric device 42.

The above piezoelectric actuator has a disadvantage are follows. If the piezoelectric device in the actuator comes into failure, an exchange of the piezoelectric device is required. However, the piezoelectric device is securely fixed to the substrate of the actuator. If any failure appears in the piezoelectric device, then it is required to exchange the actuator and all. Further, if it is required to change a performance of the piezoelectric device only, then the actuator and all are exchanged.

Further, the above actuator has no displacement enlarging feature. For that reason, if a large displacement of the movable member, then it is required to design the piezoelectric device to have a large length in an expanding direction thereof.

The cylindrical shape of the piezoelectric device 42 has a poor resistivity to a load in the radius direction.

SUMMARY OF THE INVENTION

Accordingly, it is a primary object of the present invention to provide a novel structure of a piezoelectric actuator free from any disadvantages as described above.

It is a further object of the present invention to provide a novel structure of a piezoelectric actuator with a displacement enlarging feature wherein the structure may facilitate an exchange of a piezoelectric device only.

It is a furthermore object of the present invention to provide a novel structure of a piezoelectric actuator with a displacement enlarging feature wherein the piezoelectric device always receives a compression load to prevent any breaking due to a tensile load thereto.

It is a moreover object of the present invention to provide a novel piezoelectric actuator with a displacement enlarging feature wherein the piezoelectric device receives a adjustable compress ion load.

The invention provides a novel piezoelectric actuator. A housing has a top portion with an opening. A Y-shaped member comprises a bottom arm and divided two top arms wherein the bottom arm is fixed on a bottom portion of the housing and the divided two top arms are placed in a movable state. A detachable member is so fitted into the opening of the housing as to be detachable from the opening of the housing. A piezoelectric device having one end is fixed to the detachable member and the opposite end being in contact with a valley portion of the Y-shaped member so that when the piezoelectric device extends in a longitudinal direction by a voltage application then the opposite end presses down the alley portion thereby a distance between the tops of the divided two top arms of the Y-shaped member is enlarged. A beam has opposite ends being fixed to topes of the divided top arms and a center portion displaceable in a vertical direction when a distance between the tops Of the divided top arms of the Y-shaped member is changed. The detachable member has a disk like shape to be fitted into the opening by a thread fastening. The disk like shaped detachable member has an external surface being provided with a groove to be engaged with a tool for rotating the disk like shaped detachable member. A load applying member is provided around the bottom arm of the Y-shaped member and pressing the bottom of the housing in a downward direction and a branched portion of the Y-shaped member in a upward direction.

BRIEF DESCRIPTIONS OF THE DRAWINGS

Preferred embodiments of the present invention will hereinafter be described in detail with reference to the accompanying drawings.

PREFERRED EMBODIMENTS OF THE INVENTION

Figure 1:
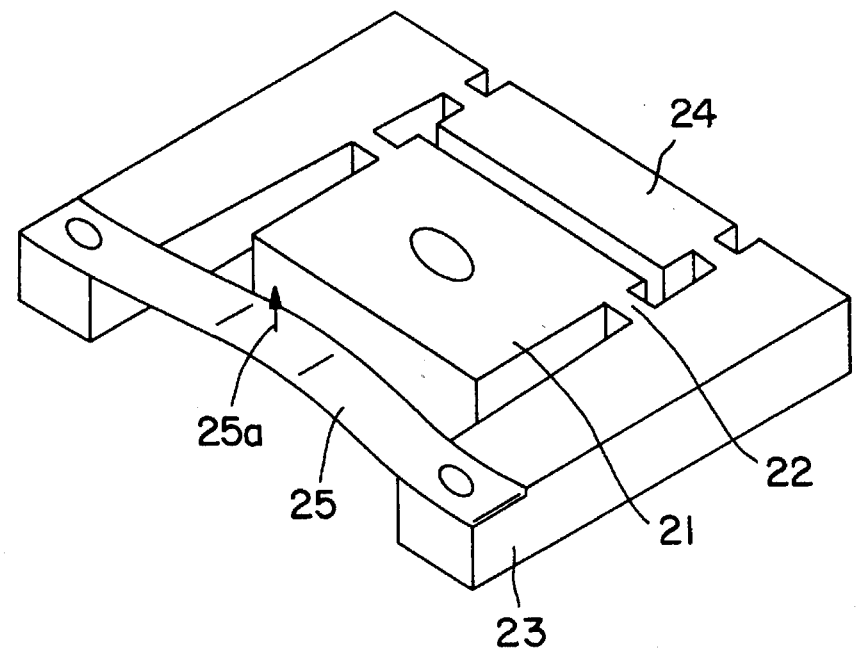
FIG. 1 is a perspective view illustrative of the conventional piezoelectric actuator with the displacement enlarging feature.
Figure 2:
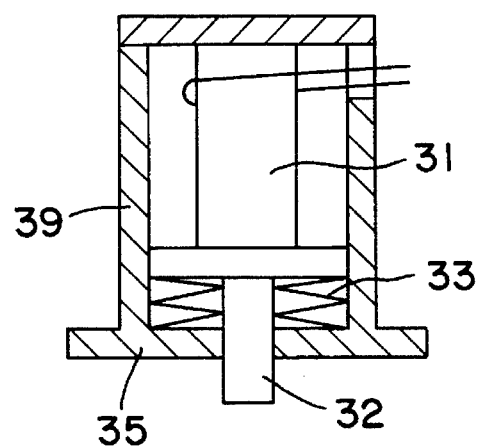
FIG. 2 is a cross sectional elevation view illustrative of another type conventional piezoelectric actuator without any displacement enlarging feature.
Figure 3:
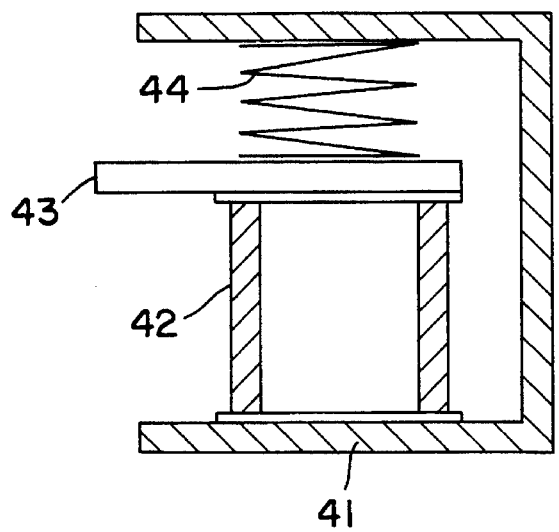
FIG. 3 is a cross sectional elevation view illustrative of still another type conventional piezoelectric actuator without any displacement enlarging feature.
Figure 4:
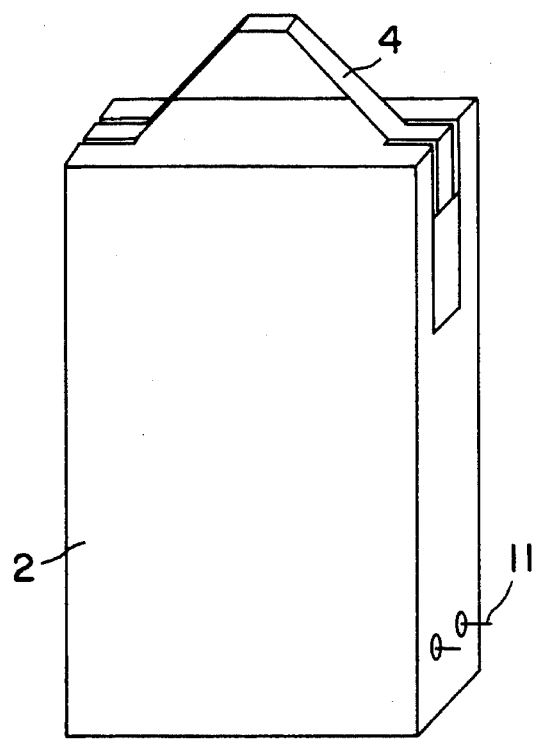
FIG. 4 is a perspective view illustrative of a novel piezoelectric actuator with a displacement enlarging feature in a first embodiment according to the present invention.
Figure 5:
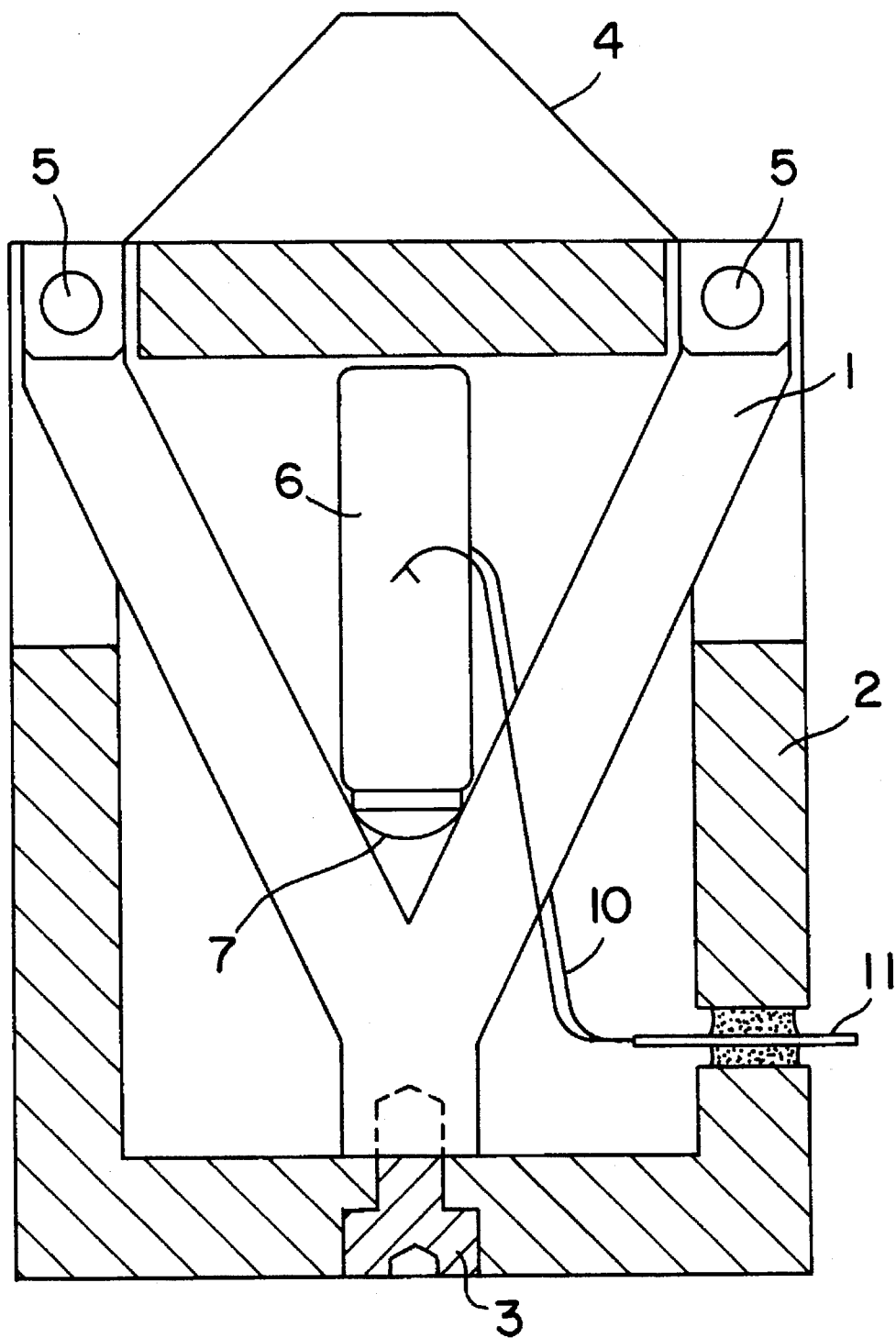
FIG. 5 is a cross sectional elevation view illustrative of a novel piezoelectric actuator with a displacement enlarging feature of FIG. 4.
Figure 6:
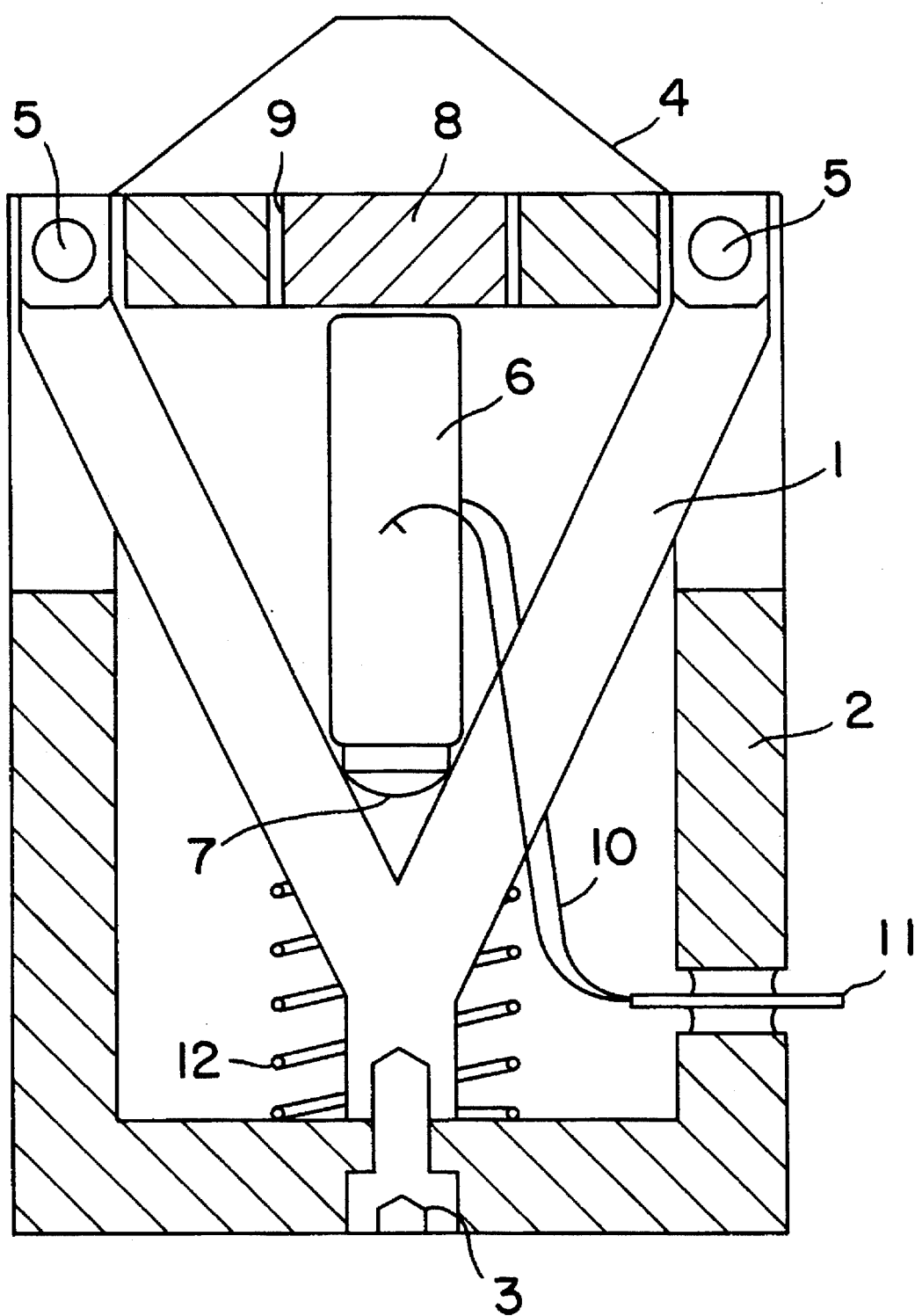
FIG. 6 is a cross sectional elevation view illustrative of a novel piezoelectric actuator with a displacement enlarging are in a second embodiment according to the present invention.

A first embodiment according to the present invention will be described with reference to FIGS. 4 and 5 wherein a novel piezoelectric actuator with a displacement enlarging feature is provided.

The novel piezoelectric actuator has a Y-shaped member 1 accommodated in a housing 2. A bottom portion of the Y-shaped member 1 is securely fixed on a bottom of the housing 2 by a screw 3, while branched two top portions of the Y-shaped member 1 are mechanically connected to opposite sides of a beam 4 through rivets 5. The beam 4 has a larger length than a distance between the two top portions of the Y-shaped member 1 so that the beam always has a bend to have a center portion of the beam 4 lies at a high level than the level of the opposite ends thereof. If the distance between the two top portions of the Y-shaped member 1, then the center portion of the beam 4 is raised up. A piezoelectric device 6 is So provided that a head portion of the piezoelectric device 6 is made into contact with a valley portion of the Y-shaped member 1. An opposite end to the head portion of the piezoelectric device 6 is securely fixed by an adhesive to a disk-shaped holding member 8 whose peripheral portion has an external thread structure that is engaged with an internal thread structure provided on a peripheral side face of an opening 9 of the top of the housing 2. The disk-shaped holding member has an opposite surface to the surface fixed to the piezoelectric device 6 so that the opposite surface has a groove such as a mines groove, a plus groove and a hexagonal groove being engaged with a plus or mines driver and a hexagonal wrench for a thread fastening of the disk-shaped holding member 8 into the opening 9 of the housing 2. As a result, the disk-shaped holding member 8 is detachablely mounted to the housing 2 by the thread fastening. By use of the driver or the wrench engaged with the groove of the holding member 8, the holding member 8 is readily detached from the housing 2 thereby the piezoelectric device 6 fixed with the detachable holding member 8 is also readily detached by use of the driver or the wrench being engagable with the groove of the disk-shaped holding member 8.

If the piezoelectric device 6 comes into failure, then it is readily possible to detach the failure piezoelectric device 6 from the housing 2 by use of the driver or wrench to be engaged with the groove of the disk-shaped holding member 8 for a facilitation of the required exchange of the piezoelectric device only.

If a change of the performance of the piezoelectric device 6 is required, then it is also readily possible to detach the failure piezoelectric device 6 from the housing 2 by use of the driver or wrench to be engaged with the groove of the disk-shaped holding member 8 for a facilitation of the required exchange of the piezoelectric device only.

The piezoelectric device 6 is electrically connected to lead terminals 11 through lead wires 10 so that the piezoelectric device 6 receives a voltage through the lead terminals 11 and the lead wires 10 to show an expansion thereof in a longitudinal direction thereby the Y-shaped member 1 is depressed at its valley portion with the head portion of the piezoelectric device 6. AS a result, the two branched arms of the Y-shaped member are spread out to enlarge the distance between the top portions of the Y-shaped member 1 so that the center portion of the beam 4 comes down.

A second embodiment according to the present invention will be described with reference to FIG. wherein a novel piezoelectric actuator with a displacement enlarging feature is provided.

The novel piezoelectric actuator with the displacement enlarging feature in the second embodiment has a difference in structure from that of the first embodiment. The structural difference of the piezoelectric actuator of the second embodiment from that of the first embodiment is in further providing a coiled spring to apply a preload or a compression load to the piezoelectric device 6.

The novel piezoelectric actuator has a Y-shaped member 1 accommodated in a housing 2. A bottom portion of the Y-shaped member 1 is securely fixed on a bottom of the housing 2 by a screw 3, while branched two top portions of the Y-shaped member 1 are mechanically connected to opposite sides of a beam 4 through rivets 5. The beam 4 has a larger length than a distance between the two top portions of the Y-shaped member 1 so that the beam always has a bend to have a center portion of the beam 4 lies at a high level than the level of the opposite ends thereof. If the distance between the two top portions of the Y-shaped member 1, then the center portion of the beam 4 is raised up. A piezoelectric device 6 is so provided that a head portion of the piezoelectric device 6 is made into contact with a valley portion of the Y-shaped member 1. An opposite end to the head portion of the piezoelectric device 6 is securely fixed by an adhesive to a disk-shaped holding member 8 whose peripheral portion has an external thread structure that is engaged with an internal thread structure provided on a peripheral side face of an opening 9 of the top of the housing 2. The disk-shaped holding member has an opposite surface to the surface fixed to the piezoelectric device 6 so that the opposite surface has a groove such as a mines groove, a plus groove and a hexagonal groove being engaged with a plus or mines driver and a hexagonal wrench for a thread fastening of the disk-shaped holding member 8 into the opening 9 of the housing 2. As a result, the disk-shaped holding member 8 is detachably mounted to the housing 2 by the thread fastening. By use of the driver or the wrench engaged with the groove of the holding member 8, the holding member 8 is readily detached from the housing 2 thereby the piezoelectric device 6 fixed with the detachable holding member 8 is also readily detached by use of the driver or the wrench being engagable with the groove of the disk-shaped holding member 8. Further, a coiled spring member 15 is provided around the bottom portion of the Y-shaped member 1 wherein one end of the spring member 12 presses the bottom of the housing 2 while the other end of the coiled spring member 12 presses up the branch portion of the Y-shaped member 1 thereby a distance between the two branched arms of the Y-shaped member 1 become narrow. As a result, the head portion of the piezoelectric device 6 is pressed up thereby the piezoelectric device 6 receives a compression load or a preload to make the piezoelectric device 6 free from any tensile load. In place of the coiled spring, an initially corned disk spring, a coiled wave spring and a coiled wave washer and a shape memory alloy spring are available.

The coiled spring 12 is so provided around the bottom portion of the Y-shaped member 1 as not to prevent an exchange of the piezoelectric device 6.

Whereas modifications of the present invention will no doubt be apparent to a person having ordinary skill in the art, to which the invention pertains, it is to be understood that the embodiments shown and described by way of illustrations are by no means intended to be considered in a limiting sense. Accordingly, it is to be intended to cover by claims all modifications of the present invention which fall within the spirit and scope of the invention.

What is claimed is:

1. A piezoelectric actuator comprising:

a housing having a top portion with an opening;

a Y-shaped member comprising a bottom arm and divided two top arms, said bottom arm being fixed on a bottom portion of said housing and said divided two top arms being placed in a movable state;

a detachable member being so fitted into said opening of said housing as to be detachable from said opening of said housing;

a piezoelectric device having one end being fixed to said detachable member and the opposite end being in contact with a valley portion of said Y-shaped member so that when said piezoelectric device extends in a longitudinal direction by a voltage application then the opposite end presses down said alley portion thereby a distance between said tops of said divided two top arms of said Y-shaped member is enlarged; and a beam having opposite ends being fixed to tops of said divided top arms and a center portion displaceable in a vertical direction when a distance between said tops of said divided top arms of said Y-shaped member is changed.

2. The actuator as claimed in claim 1, wherein said detachable member has a disk like shape to be fitted into said opening by a thread fastening.

3. The actuator as claimed in claim 2, wherein said disk like shaped detachable member has an external surface being provided with a groove to be engaged with a tool for rotating said disk like shaped detachable member.

4. The apparatus as claimed in claim 1, further comprising a load applying member being provided around said bottom arm of said Y-shaped member and pressing said bottom of said housing in a downward direction and a branched portion of said Y-shaped member in a upward direction.

* * * * *